Aug. 12, 1958  D. M. SMYTH ET AL  2,847,493
BATTERY
Filed March 22, 1955

DONALD SMYTH
GEORGE SHIRN
KURT LEHOVEC
INVENTORS

BY Connolly and Hutz

THEIR ATTORNEYS

# 2,847,493

BATTERY

Donald M. Smyth, George A. Shirn, and Kurt Lehovec, Williamstown, Mass., assignors to Sprague Electric Company, North Adams, Mass., a corporation of Massachusetts Application March 22, 1955, Serial No. 495,984

4 Claims. (Cl. 136—83)

The present invention relates to batteries or primary cells.

Among the objects of the present invention is the provision of a new type of battery which is suitable for a great many applications.

Figure 1:
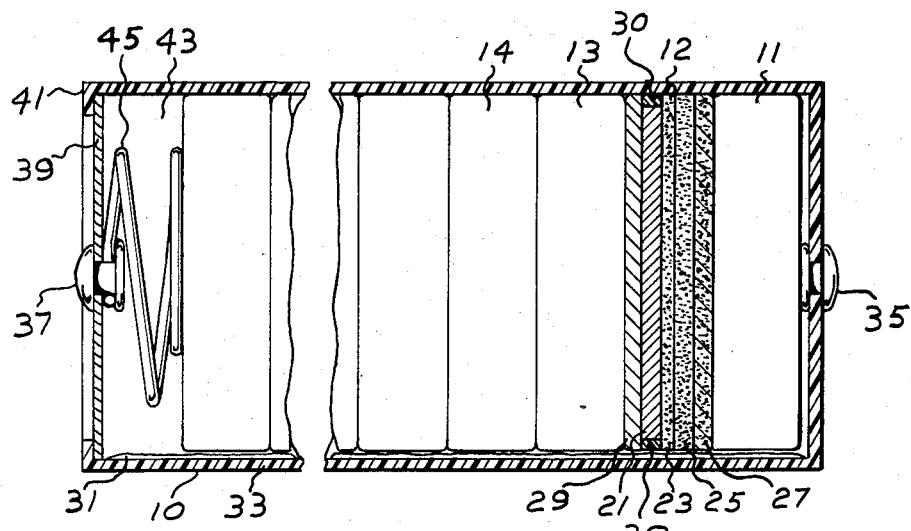
Figure 2:
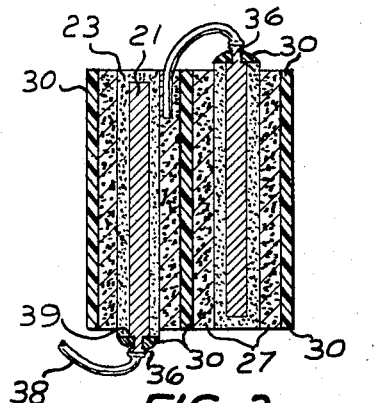
Figure 3:
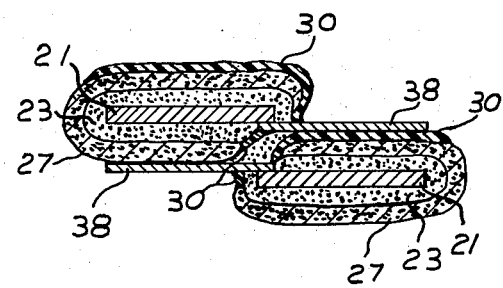

The above as well as other advantages of the present invention will be more clearly understood from the following description of several of its exemplifications, reference being made to the accompanying drawing wherein;

Fig. 1 is a view partly in section of a battery embodying the present invention; and Figs. 2 and 3 are cross sections of modified individual cells embodying the present invention.

It has been discovered that a very effective form of battery can be made with a silver negative electrode, an iodine positive electrode, and an inter-electrode ionic conductor including a barrier-electrolyte layer of silver chloride connecting the two electrodes. The iodine electrode can be in the form of a porous electronic conductor exposed to iodine vapors. The silver electrode can have a portion of its surface in contact with the ionic conductor, the remainder of its surface being covered by a conductor inert to iodine.

A suitable construction is shown in the drawing of Fig. 1 where a battery 10 is illustrated as made up of a multiplicity of individual cells 11, 12, 13, 14, etc. Each individual cell has a silver foil 21 with one surface covered by a layer of silver chloride 23. Over the silver chloride there is shown a layer of silver iodide 25 which in turn is covered by a porous conductor 27 such as a thin sheet of porous tantalum.

In order to make sure that the cell has a long life particularly when not in use, the silver chloride layer 23 should come into intimate engagement with the silver surface it covers, or should otherwise protect the silver from exposure to the iodine. To this end the silver chloride can be formed in situ as by merely introducing the silver into an atmosphere of free chlorine held at 200 to 400° C.

An additional technique for assuring a long life is the application to the silver of an external contact that is inert to iodine. In Fig. 1, for example, the face of the silver foil opposite the chloride layer 23 is coated by a layer 29 of rhodium. Although rhodium is utilized in the specific example of Fig. 1, layer 29 may be of other material that is chemically inert to iodine, e. g. palladium or tantalum. The rhodium coating is shown as extending over an entire face of the foil with the marginal edges being coated with an electronic insulator material 30 which isolates the layer 29 from the chloride layer 23. Such a material must be impervious as well as non-reactive with the iodine. For best results the silver chloride layer 23 and the contact layer 29 should together completely cover the silver. However, the layers can be of different sizes and shapes and for example the silver chloride layer can be applied over both surfaces and edges of the silver except for one small portion of the external portion which can have the rhodium plating. On the other hand, the rhodium plating can be extended over substantially the entire surface with only a small part devoted to the silver chloride covering. The latter arrangement is not as desirable where the cell is to have the maximum current output.

The electronic insulator material 30 has been shown to isolate the conductive layer of rhodium 29 present on the surface of the silver electrode from the chloride layer 23. Without this isolation of these two elements by the electronic insulation material a silver iodide coating would eventually cover the protective electrode of rhodium, thus breaking the electrical contact between the cells. With it present the migration of the silver chloride layer will not take place on the surface of the rhodium so as to subsequently react with the iodine and form a silver iodide insulating layer. In the construction of Fig. 1 the protective material is readily applied to the disc or plate marginal edges as a coating of a monomer or low polymeric weight resin which is subsequently polymerized to an insoluble state by appropriate cross-linking or polymerizing agents. A suitable resin is the epoxyline type which can be polymerized to the thermoset state by any of the well-known polymerizing agents including the diisocyanates, butylated urea formaldehyde and the peroxides. Generally the electronic insulator material 30 encompasses both thermoset and thermoplastic resins which adhere to the silver so as to prevent silver migration to the protective conductive coating 29 and are impervious and non-reactive with the iodine. These resins include silicones, such as methyl phenyl polysiloxane, chlorinated rubber, polytetrafluoroethylene, monochlorotrifluoroethylene, the epoxyline resins referred to above, the polysulfide epoxy resins, polyesters including the polyacrylic ester and styrene copolymers thereof, vinyl resins such as polyvinyl butyrol, polyvinylidine chloride and polyvinyl chloride, and also diallyl phthalate. They are imposed as a barrier between the coating 29 and the chloride layer 23 simply by polymerization in situ of either the monomer or low molecular weight polymer. They can also be applied by other methods such as stacking a number of the sub-electrodes together which have both the silver chloride and rhodium layers attached in a pile, coating all the edges simultaneously by spraying, brushing or dipping, thereafter polymerizing and subsequently separating the various elements.

The porous layer 27 is impregnated with or exposed to the vapors of free iodine. A mass of such free iodine 31 can, for example, be contained within the casing 33 in which the cells are housed. It is usually preferable to also impregnate the porous sheet with iodine as by immersing it in a body of iodine molten under a liquid such as 96% sulfuric acid (4% water by weight), for example, and then alternately lowering and raising the pressure. The lowering of the pressure expels most of the absorbed gas from the porous sheet, and the increase in pressure causes the liquid iodine to be forced into these pores.

Fig. 1 shows the cells 11, 12, 13, etc. stacked together with the porous sheet of each cell contacting the rhodium plating 29 of the adjacent cell, except for the last cell 11, the porous sheet of which functions as a terminal contact. This places the cells in series so that their individual voltages are added and a relatively high voltage is developed by the battery 10. External connections for the battery are shown as rivet type terminals 35 and 37 staked into opposite ends of the housing 33. The housing itself can be in the form of a dielectric container of resin, for instance, having an open end which is covered by a plate 39. The marginal edge 41 of the container can be flanged over the edge of the plate as indicated at 41 and can be either cemented or fused in place to hermetically seal the housing.

Inasmuch as there will generally be a gradual increase in thickness in cells as current is drawn, the drawing shows an expansion space 43 provided at one end of the stack of cells. A spring 45 resiliently holds the stack together and also provides the connection to external lead 37. The spring can have its outer end clamped under the staked-over base of terminal 37. The spring 45 as well as plate 39 and terminals 35, 37 should be made of material that is chemically inert to iodine. They can accordingly be made of ordinary steels or copper plated with such metals as rhodium, palladium, and tantalum. A plating only about $1/10$ to $1/2$ mil thick is generally sufficient to provide steel or copper with all the desired resistance to iodine. The contact layer 29 of the individual cells can also be made of palladium in the same way.

In Figs. 2 and 3 there are pictured in cross-section articles of manufacture which convert themselves into primary battery cells when they are connected in a closed electrical circuit.

It is seen in Fig. 2 the protective metallic contact is no longer needed. Rather the silver foil electrode 21 is virtually completely covered with the silver chloride layer 23, with the exception of only a small projecting extension from the main body of the silver foil. The extended area 36 is butt-welded or otherwise electrically connected to the lead wire 38 which forms the electrical connection between the various cells which are normally stacked. Any number of cells such as set forth in Fig. 2 can be stacked in succession to form the battery by separating each successive cell by an electronic insulating material such as that previously discussed with regard to Fig. 1. A most suitable resin for serving as the spacer 30 between the successive cells would be the haloethylenes, particularly polytetrafluoroethylene, and polytrifluoro monochloroethylene resin. On both sides of the disc, having its silver halide coating 23, is the porous electrode material 27 containing iodine. Such a porous electrode material encompasses carbon granules which are fully impregenated with the iodine vapor. Alternatively, the porous tantalum sheet of Fig. 1 or other equivalent structures could be used which we discuss later in this specification. It is readily seen that the lead wire 38 which extends from the silver is placed into the adjacent cell so as to make series or parallel contact as might be desired for any particular application. This lead wire 38 should be of a metal which is chemically inert to the iodine and for this particular application might well be rhodium, palladium, or tantalum. At the junction of the silver to silver chloride layer 39 it is to be noted that this junction is covered by an electronic insulating material 30. The presence of this material prevents the migration of the silver chloride layer along the rest of the silver foil 23 and then onto the lead wire 38 so as to eventually form an insulating film on the surface of 38 and prevent electrical connection of the successive stages of the cell. After the cells have been assembled and connected in series or in parallel, as desired, by spot welding the contacts to the successive cells, the entire assembly is potted in a resin. It should be of the type similar to that of the insulating material 30 that is inert to the iodine and also not transmissive to substantial amounts of the vapor. There is one further utility to this modification in addition to avoiding the need of the metallic coating on the silver which is the utilization of both sides of the silver foil, thus increasing the available current per unit area of the foil.

Referring now to Fig. 3, we have a still further modification of the cell within the scope of the present invention. This construction does not require external connection between cells such as shown in Fig. 2. In this construction the individual cells are stacked in two adjacent piles and are connected in series by means of thin strips of metal, which metal again must be inert to the iodine and may include rhodium, palladium and tantalum, the latter being preferred for economic reasons. The individual units consisting of a silver foil 21, the silver chloride layer 23 and the porous electrode containing iodine 27 are constructed by spot-welding a thin conductor 38, preferably of tantalum, to a tab on each portion of the silver foil 21 which is then completely covered with the silver chloride by exposure to the chlorine gas at an elevated temperature. Thereafter the unit of each individual cell is dipped into an alcoholic suspension of colloidal graphite which is saturated with iodine to form the porous electrode 27. The junction of the silver chloride with the tantalum is coated with a protective plastic 30 so as to prevent the attack of the tantalum by the iodine and further to prevent the surface growth and migration of the silver chloride. The cells are thereafter stacked as shown in Fig. 3 with an insulating film of material 30 such as polytetrafluoroethylene resin film. Alternatively, each film may be dipped or sprayed into the appropriate resinous solution which thereafter thermosets to form the insulating layer 30 between the individual cells.

In place of the porous tantalum sheet 27 other types of porous materials such as felted or woven asbestos or glass fibers can be used. Where the porous sheet is made of such non-conductive materials they should be partially impregnated with finely divided graphite particles so that they have a good electronic conductivity. For the purposes of the present invention a conductivity of as little as one micromho per centimeter cube is satisfactory although higher conductivities can be used if desired.

The sheet 27 can also be a thin layer of porous carbon or other conductive materials which are inert to the iodine vapors. Porous tantalum is preferred, however, and can be readily provided by merely sintering or welding such a porous layer onto the plated back of a silver foil 21 for example. Porous sheets as thin as 2 to 20 mils can be readily provided in this manner, and after the exposed face of the silver foil is covered with the silver chloride layer, will function as a permanently combined pair of electrodes for adjacent cells. The silver chloride layer, although essential as a protective cover for this silver, can have a thickness as small as 10 to 30 microns. The exposure of silver to a chlorine atmosphere at 300° C. for one hour will provide a coating about 15 to 20 microns thick.

Inasmuch as the silver and iodine are gradually converted to silver iodide during the operation of the battery, these materials should be sufficient in quantity to furnish the coulombic capacity desired. For maximum compactness, where high coulombic capacity is not needed, the silver foil can be as small as 1 mil thick. On the other hand where large coulombic capacity is desired, the silver should be at least 10 to 20 mils thick.

As shown in Figs. 2 and 3 it is not necessary to provide an initial layer of silver iodide inasmuch as it will be formed in its proper position by the action of the cell. Where the initial silver iodide layer is not used, the combination of the porous and the silver sheets can be very simply stacked together and inserted in a suitable container containing iodine as illustrated in the drawing, for example, without even impregnating the porous sheets beforehand.

The negative electrode which heretofore has been discussed solely as silver includes both alloys of silver and other metals such as thallium, cadmium, lead, zinc and magnesium. Although any of these metals can be used alone, or alloyed with silver, the cadmium-silver alloy is particularly advantageous. With approximately 1% by weight of cadmium in silver the ionic conductivity of the salt is surprisingly enhanced while the electronic conductivity is considerably reduced. As a general rule the metal alloyed with the silver to produce the negative electrode should be less than 5% of the weight of the silver.

Housings other than that illustrated above can also be used. The entire housing can for example be made of electrically non-conductive material except for terminals 35, 37. Resins such as polytrifluoromonochloroethylene, polyethylene, polystyrene or other materials sufficiently inert to iodine are suitable housing materials. Thermosetting resins can also be used for the housing and can for example be directly molded around the assembly of cells. For such a construction it is desirable to wrap the stacked assembly with a resin (polyethylene terephthalate) tape to keep the housing resin from being squeezed between the cells during the molding process. If an expansion chamber is to be provided with such a molded structure, it can be in the form of a slidable cup-shaped member which is fitted over a spring such as at 45, with the sides of the cup closely fitted around the adjacent cell. The joint between the cup and the adjacent cell can also be covered with the tape before molding. Although this will provide a very effective barrier for the penetration of the resin, it will not keep the cells from expanding into the open portion of the cup when they expand. Where only a relatively small number of cells are used in series, or where the total coulombic output is very small, the expansion space need not be provided since a total expansion of the order of 50 mils or so can be allowed for by the resilience of the housing ends. Where the housing is of thermoplastic material or relatively thin sheet metal, this expansion will merely push them out slightly without damaging the battery.

By reason of the silver chloride barrier-electrolyte, the cell of the present invention will have an extremely long shelf life estimated to be well over 100 years. The long life is due to the very minute internal leakage currents, which currents are approximately one-thousandth of the currents that would leak internally through a corresponding cell that does not contain the silver chloride barrier-electrolyte.

Should the positive electrode material, that is, the iodine, be removed from the system the problem of shelf life overcome by the presence of the silver chloride barrier-electrolyte is substantially avoided. For certain applications, e. g. the fusing of a shell, where the use period is rather short, but long shelf lifes are required, then such a modifying action is most desirable. This battery would consist of a metal-metal salt and an inert porous electrode contacting the metal salt. In a completely separate compartment a chemically active gas is kept which when released would react with the metal through the metal salt to produce the energy but this release would be immediately prior to the need of the energy. Typically the battery would consist of a silver film covered by a silver iodide layer contacted by a porous carbon electrode and iodine vapors kept in an adjacent puncturable compartment. By mechanical means, e. g. the acceleration of a shell, the compartment wall is fractured admitting the iodine vapor to the battery.

The undesirable diffusion of iodine can also be limited by the use of iodine complexes having much lower vapor pressures. Such a complex is potassium tri-iodide which has nearly all the reaction characteristics of free iodine which iodine complex can replace iodine as the positive electrode. The barrier-electrolyte layer thickness could be substantially diminished by the use of such an iodine complex.

The cells of the present invention provide at 20° C. an output potential of 0.685 volt, and will supply currents up to several microamperes depending upon the cross sectional area of the cell. Inasmuch as the components can be made very small, a 100 volt battery can be readily built into a volume of ½ cubic inch to supply about 1/100 of a microampere with an internal impedance no higher than about 70 megohms per cell. Currents of the above magnitude can be supplied continuously for 20 years from such a small battery before it becomes useless. For such operation the silver can be 5 mils thick, the silver chloride layer 10 microns thick, the plating 29, 0.5 mil thick, porous sheet 27, 10 mils thicks, and 0.075 cubic inch of iodine.

As many apparently widely different embodiments of this invention may be made without departing from the spirit and scope hereof, it is to be understood that the invention is not limited to the specific embodiments hereof except as defined in the appended claims.

What is claimed is:

1. An article of manufacture which converts itself into a primary battery cell when connected within a closed electrical circuit, said article comprising a silver negative electrode, an iodine positive electrode, and an inter-electrode ionic conductor including a barrier-electrolyte layer of silver chloride disposed between and connecting said electrodes.

2. An article of manufacture as set forth in claim 1 wherein said silver electrode has a portion of its surface in contact with said ionic conductor and the remainder of its surface protectively covered by a conductor inert to iodine.

3. An article of manufacture as set forth in claim 2 wherein said conductor inert to iodine is rhodium.

4. A primary cell comprising a silver negative electrode, an iodine positive electrode, an inter-electrode ionic conductor disposed between and connecting said electrodes, said inter-electrode ionic conductor including a layer of silver iodide, and said inter-electrode ionic conductor also including a barrier-electrolyte layer of silver chloride disposed between said silver negative electrode and said layer of silver iodide.

References Cited in the file of this patent

UNITED STATES PATENTS

| 2,689,876 | Lehovec | Sept. 21, 1954 |
| 2,690,465 | Broder | Sept. 28, 1954 |
| 2,696,513 | Lehovec | Dec. 7, 1954 |